(12) United States Patent
Ouyang et al.

(10) Patent No.: US 12,606,885 B2
(45) Date of Patent: Apr. 21, 2026

(54) METHOD FOR EFFICIENTLY REMOVING FLUORINE FROM SPENT LITHIUM BATTERY

(71) Applicants:GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Shibao Ouyang, Foshan (CN); Changdong Li, Foshan (CN); Yanchao Qiao, Foshan (CN); Ruokui Chen, Foshan (CN); Dingshan Ruan, Foshan (CN); Yong Cai, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 383 days.

(21) Appl. No.: 18/282,235

(22) PCT Filed: Apr. 28, 2022

(86) PCT No.: PCT/CN2022/090070
§ 371 (c)(1),
(2) Date: Sep. 15, 2023

(87) PCT Pub. No.: WO2023/050804
PCT Pub. Date: Apr. 6, 2023

(65) Prior Publication Data
US 2024/0158887 A1      May 16, 2024

(30) Foreign Application Priority Data

Sep. 28, 2021    (CN) .......................... 202111144865.1

(51) Int. Cl.
*C22B 3/44*          (2006.01)
*C22B 3/08*          (2006.01)
(Continued)

(52) U.S. Cl.
CPC .................. *C22B 3/44* (2013.01); *C22B 3/08* (2013.01); *C22B 3/22* (2013.01); *C22B 7/007* (2013.01);
(Continued)

(58) Field of Classification Search
CPC .. C22B 3/44; C22B 3/08; C22B 7/007; C22B 21/0023; C22B 3/22; C22B 21/003; H01M 10/54
See application file for complete search history.

(56) References Cited

U.S. PATENT DOCUMENTS 7,329,357 B2      2/2008  Liao

FOREIGN PATENT DOCUMENTS

CN          110669933 A        1/2020
CN          110994062 A        4/2020
(Continued)

OTHER PUBLICATIONS

International Search Report for PCT/CN2022/090070 mailed Jul. 19, 2022, ISA/CN.
(Continued)

*Primary Examiner* — Jessee R Roe
(74) *Attorney, Agent, or Firm* — Westbridge IP LLC

(57)              ABSTRACT

Disclosed is a method for efficiently removing fluorine from a spent lithium battery. The method comprises: mixing aluminum and a sodium hydroxide solution for reaction to obtain a sodium metaaluminate solution; introducing sulfuric acid into the sodium metaaluminate solution, and stirring to react at a certain temperature to obtain a fluorine removal agent; adding a sodium fluoroaluminate seed crystal and the fluorine removal agent into an impurity-removed battery powder leaching solution, introducing a sodium carbonate solution at the same time, performing reaction at a certain temperature, controlling the pH value of a reaction endpoint, and performing solid-liquid separation after the reaction is finished to obtain a fluorine-removed liquid and filter residues; and adding the sodium hydroxide solution into the filter residues for reaction, and performing solid-liquid separation to obtain a filtrate containing fluorine and aluminum, and insoluble residues. According to the present invention, fluorine removal is induced by adding the sodium fluoro- (Continued)

aluminate seed crystal; and during fluorine removal, the seed crystal sodium fluoroaluminate is firstly added into the battery leaching solution, and by means of induction of the seed crystal, combination of fluorine and aluminum in the solution can be accelerated to generate sodium hexafluoro-aluminate, the reaction time is shortened, the fluorine removal efficiency is improved, and fluorine in the solution can be removed to be lower than 20 mg/L, thereby achieving the purpose of deep fluorine removal.

10 Claims, 1 Drawing Sheet

(51) Int. Cl.
*C22B 3/22* (2006.01)
*C22B 7/00* (2006.01)
*C22B 21/00* (2006.01)
*H01M 10/54* (2006.01)

(52) U.S. Cl.
CPC ......... *C22B 21/0023* (2013.01); *H01M 10/54* (2013.01)

(56) References Cited

FOREIGN PATENT DOCUMENTS

| | | | |
|---|---|---|---|
| CN | 111139367 | A | 5/2020 |
| CN | 112079371 | A | 12/2020 |
| CN | 113957254 | A | 1/2022 |
| JP | 2014156649 | A | 8/2014 |

OTHER PUBLICATIONS

The Spanish Search Report issued on Sep. 23, 2024 for the Spanish counterpart application No. P202390153.

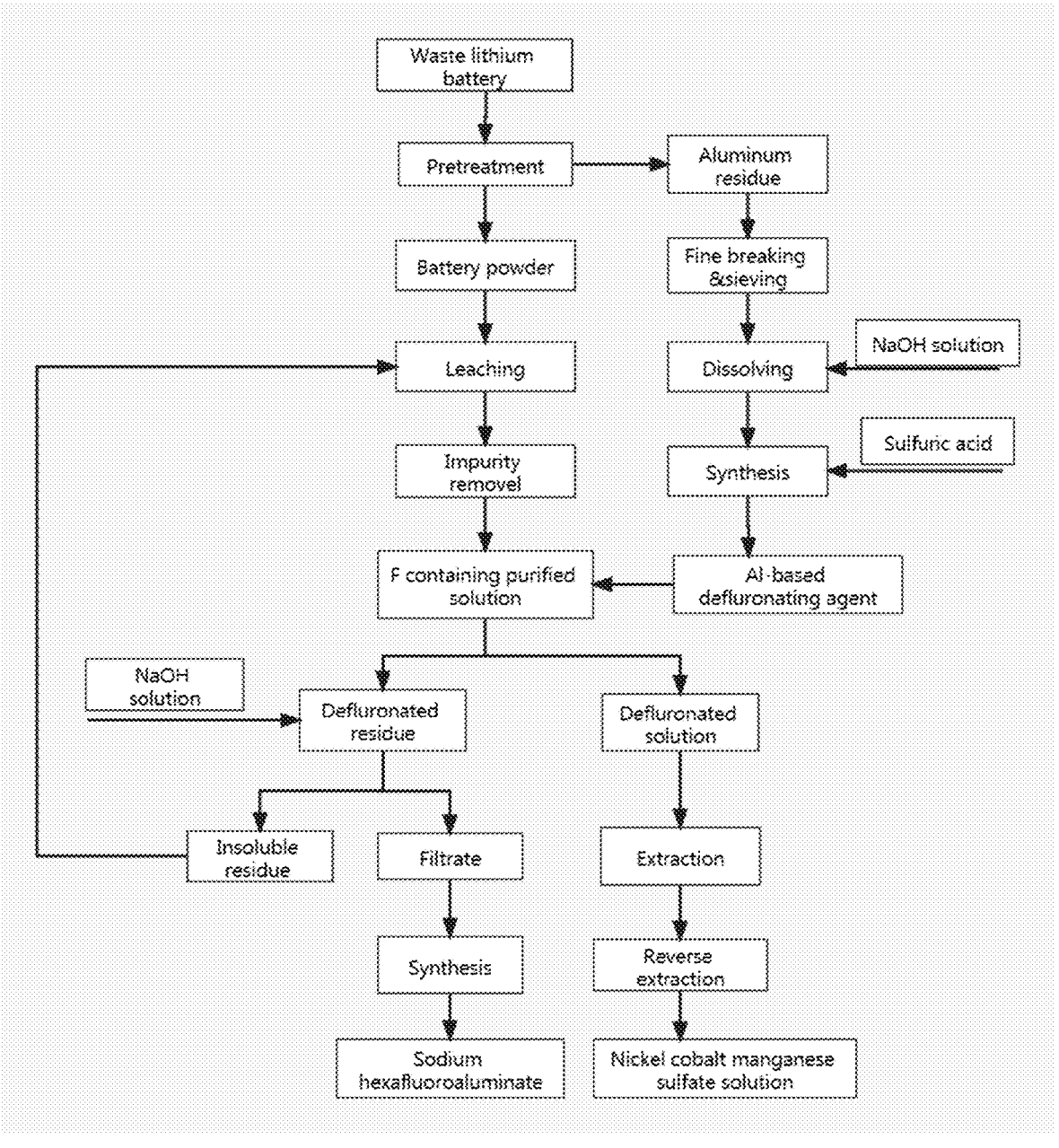

METHOD FOR EFFICIENTLY REMOVING FLUORINE FROM SPENT LITHIUM BATTERY

The present application is the national phase of International Application No. PCT/CN2022/090070, titled "METHOD FOR EFFICIENTLY REMOVING FLUORINE FROM SPENT LITHIUM BATTERY", which claims the priority to Chinese Patent Application No. 202111144865.1, titled "METHOD FOR EFFICIENTLY REMOVING FLUORINE FROM SPENT LITHIUM BATTERY", filed on Sep. 28, 2021 with the Chinese National Intellectual Property Administration, the entire disclosures thereof are incorporated herein by reference.

FIELD

The invention belongs to the technical field of waste lithium battery recovery, specifically relates to a method for efficiently removing fluorine from waste lithium battery.

BACKGROUND

Lithium battery is a promising clean energy storage battery, currently mainly used in consumer electronics and new energy vehicles. With the vigorous development of China's mobile phones, notebook computers, digital cameras, electric vehicles, power tools, new energy vehicles and other industries, the demand for lithium batteries will further increase. However, lithium batteries have a service life. The service life of lithium batteries is generally 5-8 years, and the effective life is 4-6 years. Therefore, the number of waste lithium batteries will also increase sharply, and the recycling of these waste lithium batteries has also become an urgent problem to be solved.

The recycling and treatment of waste lithium batteries mainly include fire method and wet method. At present, most of the waste lithium batteries are mainly processed by the wet recycling process. The wet recycling process comprises the steps of discharging, crushing, sorting, and sieving the waste lithium batteries to obtain the battery powder, and then leaching the battery powder with acid and reducing agent to obtain metals such as nickel, cobalt, manganese, lithium, adding reagents to remove impurities, and obtaining refined nickel cobalt manganese sulfate solution after extraction, which is then used to synthesize precursor materials. Since waste lithium batteries contain electrolyte lithium hexafluorophosphate itself and sodium fluoride is introduced during impurity removal, the fluorine content in the battery powder leaching solution is 1-3 g/L. The presence of fluorine not only causes corrosion to equipment, but also affects the synthesized precursor products. At present, there are few public reports on the method of removing fluorine from battery powder leaching solution, and they mainly focus on the removal of fluorine from calcium salt system. For example, related technologies have developed a fluorine removal process for waste lithium batteries. First, calcium oxide is added to the waste battery leaching solution to remove fluorine, and then resin adsorption is used to remove fluorine again to reduce the fluorine concentration in the leaching solution. In this process, adding calcium oxide to remove fluorine will not only cause precipitation of nickel, cobalt, and manganese, but also introduce calcium ions, and it is necessary to add a subsequent calcium removal step. In view of some of the above-mentioned problems in the removal of fluorine from waste lithium batteries, it is urgent to develop some new fluorine removal processes.

SUMMARY

The present disclosure aims to solve at least one of the technical problems existing in the above-mentioned prior art. For this reason, the present disclosure provides a method for efficiently removing fluorine from waste lithium batteries.

According to one aspect of the present invention, a method for efficiently removing fluorine from waste lithium batteries is proposed, which comprises the following steps:

S1: mixing aluminum with sodium hydroxide solution for reaction to obtain sodium metaaluminate solution;

S2: introducing sulfuric acid into the sodium metaaluminate solution, stirring and reacting at a certain temperature to obtain a defluorinating agent;

S3: adding sodium fluoroaluminate seed crystals and the defluorinating agent to impurity-removed battery powder leaching solution, and introducing sodium carbonate solution at the same time, reacting at a certain temperature, and controlling pH at the end of the reaction, performing solid-liquid separation after the reaction is completed to obtain defluorinated solution and filter residue; since a small amount of aluminum ions would be dissolved during the reaction, sodium carbonate can be used to adjust pH of the solution to ensure that the aluminum ions in the solution are very low, so as to avoid the introduction of impurity aluminum during fluorine removal;

S4: adding sodium hydroxide solution to the filter residue for reaction, and performing solid-liquid separation to obtain an aluminum-fluorine containing filtrate and insoluble residue.

In some embodiments of the present invention, in step S1, the aluminum is aluminum residue powder recovered from waste lithium batteries. Specifically, the aluminum is aluminum residue powder obtained by disassembling, crushing, sorting, sieving and finely breaking the waste lithium battery. The residue material obtained by reaction of the aluminum residue powder with the sodium hydroxide solution can be added to acid leaching reaction of battery powder. The aluminum residue obtained by dismantling and crushing the waste lithium battery is used to prepare the defluorinating agent. The aluminum residue obtained by dismantling and crushing the waste lithium battery is finely broken and sieved to obtain aluminum residue powder. After adding sodium hydroxide solution for reaction, filtering to obtain sodium metaaluminate solution, and then adding sulfuric acid to prepare aluminum based defluorinating agent, which not only has good fluoride removal effect, but also greatly reduces the fluorine removal cost.

In some embodiments of the present invention, in step S1, solid-liquid ratio of the aluminum to the sodium hydroxide solution is 1: (2-5) g/ml, and mass concentration of the sodium hydroxide is 10-30%.

In some embodiments of the present invention, in step S1, reaction temperature is 50-80° C., and reaction time is 30-60 min.

In some embodiments of the present invention, in step S2, reaction temperature is 80-95° C., and stirring rate is 150-300 rpm.

In some embodiments of the present invention, in step S2, mass concentration of the sulfuric acid is 10-20%, and flow rate of the sulfuric acid is 1.0-2.5 ml/min.

In some embodiments of the present invention, in step S2, an appropriate amount of water is evaporated to concentrate the reaction solution during the reaction, until the concentration of aluminum ion in the reaction solution is controlled at 0.8-1.5 g/L, and pH at the end of the reaction is controlled at 2.0-3.0.

In some embodiments of the present invention, in step S3, the impurity-removed battery powder leaching solution is prepared by the following process: pulping the waste battery powder with water, leaching with sulfuric acid and hydrogen peroxide, and removing impurities.

In some embodiments of the present invention, in step S3, addition amount of the sodium fluoroaluminate seed crystal is 1-3 g/L; preferably, the addition amount of the fluorine removal agent is determined based on molar ratio of aluminum in the defluorinating agent to fluorine in the battery powder leaching solution as (1-1.5): 6.

In some embodiments of the present invention, in step S3, mass concentration of the sodium carbonate solution is 10-15%, and flow rate of the sodium carbonate solution introduced is 0.5-2.0 ml/min.

In some embodiments of the present invention, in step S3, reaction temperature is 40-60° C., and reaction time is 60-90 min; the pH at the end of the reaction is controlled at 5.0-5.5.

In some embodiments of the present invention, step S4 further comprises making the aluminum-fluorine containing filtrate into sodium fluoroaluminate: introducing dilute sulfuric acid into the aluminum-fluorine containing filtrate, stirring at a certain temperature and controlling pH at the end of the reaction, stop stirring after pH of the solution is stable, aging the solution for a period of time, then filtering and washing the filter residue with water, and drying to obtain sodium fluoroaluminate. More preferably, mass concentration of dilute sulfuric acid introduced is 5-12%, flow rate of dilute sulfuric acid is 0.5-2.0 ml/min, reaction temperature is 40-60° C., the stirring rate is 150-200 rpm, and the pH at the end of the reaction is 6.0-6.5, and aging time is 12-18 h.

In some embodiments of the present invention, in step S4, mass concentration of the sodium hydroxide solution is 20-30%, reaction temperature after addition of the sodium hydroxide solution to the filter residue is 80-90° C., and reaction time is 20-40 min. The reaction is carried out under stirring, and stirring speed is 200-400 rpm.

In some embodiments of the present invention, in step S4, the insoluble residue may be added to the leaching reaction of battery powder.

According to a preferred embodiment of the present invention, it has at least the following beneficial effects:

1. Through the fluorine removal process of the present invention, the fluorine removal effect is excellent. The fluorine can be removed to less than 20 mg/L, and the concentration of aluminum ions introduced into the defluorinated solution is less than 1 mg/L. There is no need to remove fluorine again after the defluorinated solution entering into the wastewater workshop after recovering nickel, cobalt, manganese and lithium. The fluorine removal rate is as high as 99%. The residue after fluorine removal can be purified to produce sodium fluoroaluminate with a purity of more than 97%. It can be used as a cosolvent in the electrolytic aluminum industry, as a pesticide for crops, as a melting agent and opalizer for enamel glaze medicine. The potential value of recycling is great.

2. The present disclosure utilizes the addition of sodium fluoroaluminate seed crystal to induce fluorine removal. The sodium fluoroaluminate seed crystal is first added to the battery leaching solution while removing fluorine. Through the induction of the seed crystal, it can not only accelerate the combination of fluorine and aluminum in the solution to form sodium hexafluoroaluminate, shorten the reaction time, improve the efficiency of fluoride removal, but also make fluorine in the solution less than 20 mg/L, so as to achieve the purpose of deep fluorine removal.

3. The fluorine removal residue can be made into high-purity sodium fluoroaluminate.

The residue obtained after fluorine removal is a mixture of sodium fluoroaluminate and nickel cobalt manganese carbonate. The sodium fluoroaluminate is dissolved by adding sodium hydroxide solution, while the nickel cobalt manganese carbonate is insoluble. After filtration, the filtrate and the filter residue are obtained. The filter residue can return to the acid leaching step of battery powder for dissolution. The filtrate is subject to pH adjustment by adding sulfuric acid for reaction, aging, filtration, washing and drying, and high purity sodium fluoroaluminate is obtained.

BRIEF DESCRIPTION OF DRAWINGS

The present invention will be further described below with reference to the accompanying drawings and examples, in which:

FIG. 1 is a process flow diagram of Example 1 of the present invention.

DETAILED DESCRIPTION

Hereinafter, the concept and technical effects of the disclosure will be clearly and completely described below in combination with the examples of the present disclosure, so that the purpose, characteristics and effects of the disclosure can be fully understood. Obviously, the described examples are only some examples of the disclosure, rather than all of the examples. Based on the examples of the present disclosure, other examples obtained by those skilled in the art on the premise of paying no creative work belong to the protection scope of the present disclosure.

Example 1

A method for efficiently removing and recovering fluorine from waste lithium batteries, the specific process was:

(1) Pretreatment: after discharging, the waste lithium battery was disassembled, broken, sorted and screened to obtain battery powder and aluminum residue;

(2) Preparation of aluminum-based defluorinating agent: after the aluminum residue was finely broken, it was passed through a 100-mesh sieve to obtain aluminum residue powder; the obtained aluminum residue powder was mixed with 10% sodium hydroxide solution based on a solid-liquid ratio of 1:5 g/ml, stirred and reacted for 60 min at 80° C.; the solution was filtered to obtain insoluble residue and sodium metaaluminate solution after reaction; the insoluble residue was transferred to step (3) for acid leaching and dissolving; sulfuric acid with 10% mass concentration was added to sodium metaaluminate solution with peristaltic pump at the flow rate of 2.5 ml/min, wherein the reaction temperature was 90° C., the stirring rate was 150 rpm; and an appropriate amount of water was evaporated to concentrate the solution until the aluminum ion concentration in the solution was concentrated to 0.8 g/L, and pH was stable at 3.0; after the solution became clear, stirring was stopped to obtain a defluorinating agent containing aluminum ion;

(3) Battery powder leaching and impurity removal: the battery powder in step (1) was pulped with pure water, and then leached with sulfuric acid and hydrogen peroxide, after removing impurities, a fluorine-containing purified solution was obtained, the component content was shown in Table 1;

TABLE 1

| Component content of fluorine-containing purified solution (g/L) | | | | | |
|---|---|---|---|---|---|
| $Ni^{2+}$ | $Co^{2+}$ | $Mn^{2+}$ | $Li^+$ | $Na^+$ | $F^-$ |
| 35.45 | 8.54 | 10.71 | 2.63 | 20.35 | 2.32 |

(4) Adding sodium fluoroaluminate seed crystal to induce fluoride removal: 1 g/L sodium fluoroaluminate seed crystal was added to 0.5 L fluorine-containing purified solution in advance; and then the defluorinating agent of step (3) was added, and the amount of defluorinating agent added was determined based on the molar ratio of aluminum in the defluorinating agent to fluorine in the fluorine-containing purified solution as 1.1:6; and sodium carbonate solution with 10% mass concentration was introduced through a peristaltic pump at a flow rate of 1 ml/min under the conditions of stirring rate of 100 rpm and temperature of 40° C.; the reaction was carried on for 90 minutes, the pH at the end point of the reaction was controlled at 5.5; after reaction, the solution was filtered to obtain defluorinated solution and filter residue; the filter residue was washed twice with pure water, and the washed water was combined into the defluorinated solution to obtain a total of 0.725 L defluorinated solution;

(5) Recovery of filter residue to prepare high-purity sodium fluoroaluminate: after the filter residue in step (4) was pulped with pure water, sodium hydroxide solution with 20% mass concentration was added to adjust pH to 12 and reacted for 40 minutes under the conditions of stirring rate of 200 rpm and temperature of 80° C.; the solution was filtered after reaction to obtain filtrate and insoluble residue; the insoluble residue was transferred to (3) for acid leaching and dissolution; the sulfuric acid with 12% mass concentration was added to the filtrate with a peristaltic pump at a flow rate of 0.5 ml/min; the reaction was performed at stirring rate of 150 rpm and temperature of 40° C.; stirring was stopped until the pH of the solution was stable at 6.5, the solution was aged for 12 h, then filtered. The filter residue was washed with pure water 3 times, and dried to obtain high-purity sodium fluoroaluminate.

Example 2

A method for efficiently removing and recovering fluorine from waste lithium batteries, the specific process was:

(1) Pretreatment: after discharging, the waste lithium battery was disassembled, broken, sorted and screened to obtain battery powder and aluminum residue;

(2) Preparation of aluminum-based defluorinating agent: after the aluminum residue was finely broken, it was passed through a 100-mesh sieve to obtain aluminum residue powder; the obtained aluminum residue powder was mixed with 10% sodium hydroxide solution based on a solid-liquid ratio of 1:2 g/ml, stirred and reacted for 40 min at 50° C.; the solution was filtered to obtain insoluble residue and sodium metaaluminate solution after reaction; the insoluble residue was transferred to step (3) for acid leaching and dissolving; sulfuric acid with 20% mass concentration was added to sodium metaaluminate solution with peristaltic pump at the flow rate of 1.0 ml/min, wherein the reaction temperature was 80° C., the stirring rate was 200 rpm; and an appropriate amount of water was evaporated to concentrate the solution until the aluminum ion concentration in the solution was concentrated to 1.5 g/L, and pH was stable at 2.0; after the solution became clear, stirring was stopped to obtain a defluorinating agent containing aluminum ion;

(3) Battery powder leaching and impurity removal: the battery powder in step (1) was pulped with pure water, and then leached with sulfuric acid and hydrogen peroxide, after removing impurities, a fluorine-containing purified solution was obtained, the component content was shown in Table 2;

TABLE 2

| Component content of fluorine-containing purified solution (g/L) | | | | | |
|---|---|---|---|---|---|
| $Ni^{2+}$ | $Co^{2+}$ | $Mn^{2+}$ | $Li^+$ | $Na^+$ | $F^-$ |
| 25.47 | 10.45 | 14.28 | 2.44 | 19.36 | 2.41 |

(4) Adding sodium fluoroaluminate seed crystal to induce fluoride removal: 3 g/L sodium fluoroaluminate seed crystal was added to 0.8 L fluorine-containing purified solution in advance; and then the defluorinating agent of step (3) was added, and the amount of defluorinating agent added was determined based on the molar ratio of aluminum in the defluorinating agent to fluorine in the fluorine-containing purified solution as 1.3:6; and sodium carbonate solution with 15% mass concentration was introduced through a peristaltic pump at a flow rate of 1 ml/min under the conditions of stirring rate of 50 rpm and temperature of 60° C.; the reaction was carried on for 60 minutes, the pH at the end point of the reaction was controlled at 5.5; after reaction, the solution was filtered to obtain defluorinated solution and filter residue; the filter residue was washed twice with pure water, and the washed water was combined into the defluorinated solution to obtain a total of 1.6 L defluorinated solution;

(5) Recovery of filter residue to prepare high-purity sodium fluoroaluminate: after the filter residue in step (4) was pulped with pure water, sodium hydroxide solution with 30% mass concentration was added to adjust pH to 14 and reacted for 20 minutes under the conditions of stirring rate of 400 rpm and temperature of 90° C.; the solution was filtered after reaction to obtain filtrate and insoluble residue; the insoluble residue was transferred to (3) for acid leaching and dissolution; the sulfuric acid with 10% mass concentration was added to the filtrate with a peristaltic pump at a flow rate of 1.0 ml/min; the reaction was performed at stirring rate of 200 rpm and temperature of 60° C.; stirring was stopped until the pH of the solution was stable at 6.0, the solution was aged for 18 h, then filtered. The filter residue was washed with pure water 3 times, and dried to obtain high-purity sodium fluoroaluminate.

Example 3

A method for efficiently removing and recovering fluorine from waste lithium batteries, the specific process was:

(1) Pretreatment: after discharging, the waste lithium battery was disassembled, broken, sorted and screened to obtain battery powder and aluminum residue;

(2) Preparation of aluminum-based defluorinating agent: after the aluminum residue was finely broken, it was passed through a 100-mesh sieve to obtain aluminum residue powder; the obtained aluminum residue powder was mixed with 20% sodium hydroxide solution based on a solid-liquid ratio of 1:3 g/ml, stirred and reacted for 50 min at 65° C.; the solution was filtered to obtain insoluble residue and sodium metaaluminate solution after reaction; the insoluble residue was transferred to step (3) for acid leaching and dissolving; sulfuric acid with 15% mass concentration was added to sodium metaaluminate solution with peristaltic pump at the flow rate of 1.5 ml/min, wherein the reaction temperature was 85° C., the stirring rate was 250 rpm; and an appropriate amount of water was evaporated to concentrate the solution until the aluminum ion concentration in the solution was concentrated to 1.0 g/L, and pH was stable at 2.50; after the solution became clear, stirring was stopped to obtain a defluorinating agent containing aluminum ion;

(3) Battery powder leaching and impurity removal: the battery powder in step (1) was pulped with pure water, and then leached with sulfuric acid and hydrogen peroxide, after removing impurities, a fluorine-containing purified solution was obtained, the component content was shown in Table 3;

TABLE 3

| Component content of fluorine-containing purified solution (g/L) | | | | | |
|---|---|---|---|---|---|
| $Ni^{2+}$ | $Co^{2+}$ | $Mn^{2+}$ | $Li^+$ | $Na^+$ | $F^-$ |
| 10.32 | 32.45 | 8.43 | 2.54 | 18.87 | 2.35 |

(4) Adding sodium fluoroaluminate seed crystal to induce fluoride removal: 2 g/L sodium fluoroaluminate seed crystal was added to 1.0 L fluorine-containing purified solution in advance; and then the defluorinating agent of step (3) was added, and the amount of defluorinating agent added was determined based on the molar ratio of aluminum in the defluorinating agent to fluorine in the fluorine-containing purified solution as 1.2:6; and sodium carbonate solution with 12% mass concentration was introduced through a peristaltic pump at a flow rate of 1 ml/min under the conditions of stirring rate of 80 rpm and temperature of 50° C.; the reaction was carried on for 70 minutes, the pH at the end point of the reaction was controlled at 5.5; after reaction, the solution was filtered to obtain defluorinated solution and filter residue; the filter residue was washed twice with pure water, and the washed water was combined into the defluorinated solution to obtain a total of 1.56 L defluorinated solution;

(5) Recovery of filter residue to prepare high-purity sodium fluoroaluminate: after the filter residue in step (4) was pulped with pure water, sodium hydroxide solution with 25% mass concentration was added to adjust pH to 12 and reacted for 30 minutes under the conditions of stirring rate of 300 rpm and temperature of 85° C.; the solution was filtered after reaction to obtain filtrate and insoluble residue; the insoluble residue was transferred to (3) for acid leaching and dissolution; the sulfuric acid with 5% mass concentration was added to the filtrate with a peristaltic pump at a flow rate of 2.0 ml/min; the reaction was performed at stirring rate of 180 rpm and temperature of 50° C.; stirring was stopped until the pH of the solution was stable at 6.5, the solution was aged for 15 h, then filtered. The filter residue was washed with pure water 3 times, and dried to obtain high-purity sodium fluoroaluminate.

Comparative Example 1

A method for removing fluorine from the leaching solution of a waste lithium battery, the specific process was as follows:

(1) Pretreatment: after discharging, the waste lithium battery was disassembled, broken, sorted and screened to obtain battery powder;

(2) Battery powder leaching and impurity removal: the battery powder in step (1) was pulped with pure water, and then leached with sulfuric acid and hydrogen peroxide; after impurity removal, a fluorine-containing purified solution was obtained; the component content was shown in Table 4;

TABLE 4

| Component content of fluorine-containing purified solution (g/L) | | | | | |
|---|---|---|---|---|---|
| $Ni^{2+}$ | $Co^{2+}$ | $Mn^{2+}$ | $Li^+$ | $Na^+$ | $F^-$ |
| 33.29 | 10.28 | 12.56 | 2.45 | 19.55 | 2.39 |

(3) Adding calcium hydroxide to remove fluorine: 3.0 times theoretical amount of calcium hydroxide required to react with fluorine was added to 0.5 L fluorine-containing purified solution; stirred and reacted at 60° C. for 90 minutes; 15% sulfuric acid was added to maintain the pH of the solution at 5.5; after the reaction, filtered to obtain defluorinated solution and filter residue; the filter residue was washed twice with pure water, and the washed water was combined into the defluorinated solution to obtain a total of 2.3 L defluorinated solution;

(4) Purification of the defluorinated residue: the defluorinated residue of step (3) was pulped with pure water, 20% sulfuric acid was added to adjust pH to 1.5, and reacted for 40 min under the conditions of stirring rate of 300 rpm and temperature of 85° C.; after the reaction, the solution was filtered to obtain filtrate and insoluble residue; the insoluble residue was washed 3 times with pure water, and the washed water was combined into the filtrate, and the filtrate was transferred to (2) for the pulping of battery powder, and the insoluble residue was washed and dried to obtain purified calcium fluoride.

Test Example

Table 5 shows the comparison of fluorine removal performance between Examples 1-3 and Comparative Example 1. The specific data was obtained by testing with fluoride ion selective electrode and ICP-AES equipment.

TABLE 5

| | F concentration of F-containing purified solution (g/L) | F concentration of defluorinated solution(g/L) | Impurity concentration of defluorinated solution(g/L) | Fluorine removal rate(%) | Purity of residue after purification(%) |
|---|---|---|---|---|---|
| Example 1 | 2.32 | 0.016 | <0.001(Al) | 99% | 97% |
| Example 2 | 2.41 | 0.012 | <0.001(Al) | 99% | 97% |
| Example 3 | 2.35 | 0.015 | <0.001(Al) | 99% | 98% |
| Comparative example 1 | 2.39 | 0.078 | 0.28(Ca) | 85% | 81% |

Comparison of fluorine removal performance of defluorinating agent between the Examples and the Comparative Example.

wherein, the fluorine removal rate $$\eta = \frac{C_1 V_1 - C_2 V_2}{C_1 V_1} \times 100\%$$

(C1 and V1 are the fluorine concentration and volume of the fluorine-containing purified solution, respectively, and C2 and V2 are the fluorine concentration and volume of the defluorinated solution).

It can be seen from Table 5 that the fluorine concentration of the defluorinated solution in the examples was less than 0.02 g/L, the aluminum ion introduced after fluorine removal was less than 0.001 g/L, and the fluorine removal rate is as high as 99%. After purification, the defluorinated residue can be made into sodium fluoroaluminate with a purity of up to 97%. Compared with the comparative example, the fluorine removal effect in Examples is obviously better. The purified residue (for example calcium fluoride) of Comparative Example 1 in the table has a lower purity. This is because when calcium hydroxide is used to remove fluorine, not only calcium fluoride but also calcium sulfate is formed, thus the purity of calcium fluoride produced is not high.

The examples of the present disclosure are described in detail above with reference to the accompanying drawings, but the present disclosure is not limited to the described examples. Within the scope of knowledge possessed by the ordinary skilled person in the art, various modifications can be made without departing from the purpose of the present invention. In addition, in the case of no conflict, the examples of the present invention and the features in the examples can be combined with each other.

The invention claimed is:

1. A method for efficiently removing fluorine from waste lithium batteries, comprising the following steps:
   S1: mixing aluminum with sodium hydroxide solution for reaction to obtain sodium metaaluminate solution;
   S2: introducing sulfuric acid into the sodium metaaluminate solution, stirring and reacting at a certain temperature to obtain a defluorinating agent;
   S3: adding sodium fluoroaluminate seed crystals and the defluorinating agent to impurity-removed battery powder leaching solution, and introducing sodium carbonate solution at the same time, reacting at a certain temperature, and controlling pH at the end of the reaction, performing solid-liquid separation after the reaction is completed to obtain defluorinated solution and filter residue;

S4: adding sodium hydroxide solution to the filter residue for reaction, and performing solid-liquid separation to obtain an aluminum-fluorine containing filtrate and insoluble residue.

2. The method according to claim 1, wherein in step S1, the aluminum is aluminum residue powder recovered from waste lithium batteries.

3. The method according to claim 1, wherein in step S2, reaction temperature is 80-95° C., stirring rate is 150-300 rpm.

4. The method according to claim 1, wherein in step S2, an appropriate amount of water is evaporated to concentrate reaction solution during the reaction, until concentration of aluminum ion in the reaction solution is controlled at 0.8-1.5 g/L, and pH at the end of the reaction is controlled at 2.0-3.0.

5. The method according to claim 1, wherein in step S3, the impurity-removed battery powder leaching solution is prepared by the following process: pulping the waste battery powder with water, leaching with sulfuric acid and hydrogen peroxide, and removing impurities.

6. The method according to claim 1, wherein in step S3, addition amount of the sodium fluoroaluminate seed crystal is 1-3 g/L; the addition amount of the defluorinating agent is determined based on molar ratio of aluminum in the defluorinating agent to fluorine in the battery powder leaching solution as (1-1.5): 6.

7. The method according to claim 1, wherein in step S3, mass concentration of the sodium carbonate solution is 10-15%, flow rate of the sodium carbonate solution introduced is 0.5-2.0 mL/min.

8. The method according to claim 1, wherein in step S3, reaction temperature is 40-60° C.; reaction time is 60-90 min; and the pH at the end of the reaction is controlled at 5.0-5.5.

9. The method according to claim 1, wherein step S4 further comprises making the aluminum-fluorine containing filtrate into sodium fluoroaluminate: introducing dilute sulfuric acid into the aluminum-fluorine containing filtrate, stirring at a certain temperature and controlling pH at the end of the reaction, stop stirring after pH of the solution is stable, aging the solution for a period of time, then filtering and washing the filter residue with water, and drying to obtain sodium fluoroaluminate.

10. The method according to claim 1, wherein in step S4, mass concentration of the sodium hydroxide solution is 20-30%; reaction temperature after addition of the sodium hydroxide solution to the filter residue is 80-90° C., and reaction time is 20-40 min.

* * * * *